J. S. PECK.
ELECTRICAL EQUALIZING SYSTEM.
APPLICATION FILED NOV. 8, 1907.
924,927.
Patented June 15, 1909.
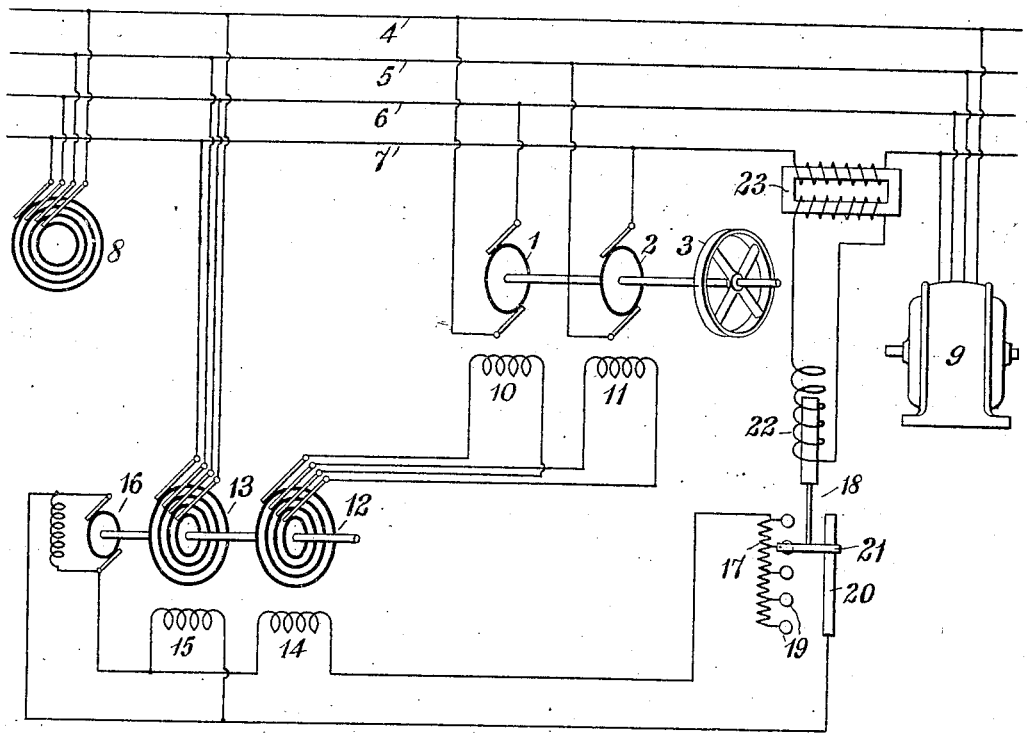
WITNESSES:
C. L. Belcher
Otto J. Schairer
INVENTOR.
John S. Peck
BY
Kelsey S. Carr
ATTORNEY IN FACT.

UNITED STATES PATENT OFFICE.

JOHN S. PECK, OF MANCHESTER, ENGLAND, ASSIGNOR TO WESTINGHOUSE ELECTRIC & MANUFACTURING COMPANY, A CORPORATION OF PENNSYLVANIA.

ELECTRICAL EQUALIZING SYSTEM.

No. 924,927.   Specification of Letters Patent.   Patented June 15, 1909.

Application filed November 8, 1907. Serial No. 401,300.

*To all whom it may concern:*

Be it known that I, JOHN S. PECK, a citizen of the United States, and a resident of Manchester, England, have invented a new and useful Improvement in Electrical Equalizing Systems, of which the following is a specification.

My invention relates to systems of electrical distribution, and particularly to means for equalizing the load upon the generating or supply station when the load upon the system is variable.

The object of my invention is to provide simple and effective means that may be employed in connection with alternating current systems of any number of phases for absorbing or yielding energy in accordance with variations in load upon the system, in such a manner that the load upon the generating or supply station of the system may remain substantially constant or may not exceed a predetermined value.

It has heretofore been proposed to employ fly-wheels, or other devices having considerable inertia, in systems of distribution that supply translating devices requiring widely varying amounts of power, and to so drive the fly-wheels and control their operation that the load upon the distributing circuit will remain substantially constant, regardless of the variations in the amount of power required by the translating devices. This result has usually been effected by providing a motor-generator set between the translating devices and the distributing circuit, the fly-wheel being coupled to the motor-generator set, and the motor being caused to increase its speed to store energy in the fly-wheel when the load afforded by the translating device is less than a predetermined value, while, when the current required by the translating device exceeds the predetermined amount, provision is made for a decrease of the motor speed, so that the fly-wheel may yield a portion of its potential energy and assist the motor to drive the generator. In such systems, however, a motor-generator set must be provided for each translating device, or set of translating devices having similar functions, and both motor and generator must be of sufficient capacity to carry the maximum load provided by the translating device.

Other systems have been devised in which only a single equalizer set need be employed when a plurality of translating devices are supplied from a distributing circuit, such systems usually comprising a rotary converter that is connected at one side to the distributing circuit and at the other side, either to a storage battery, or to a direct current dynamo-electric machine having a fly-wheel mechanically coupled thereto. With the latter arrangement, the dynamo-electric machine operates as a motor when the current required of the distributing circuit is less than a predetermined amount and stores energy in the fly-wheel, and operates as a generator when the current required of the distributing circuit is greater than the said predetermined amount, the energy previously stored in the fly-wheel being utilized as the actuating means for the generator.

In the present system, a dynamo-electric machine, that may operate either as a motor or as a generator and to which a fly-wheel is mechanically coupled, is directly connected to the distributing circuit without the intervention of a rotary converter or other device, and the arrangement is such that but comparatively small and inexpensive machines need be provided and only a single equalizer set is necessary for equalizing the load provided by a plurality of translating devices.

In its most useful embodiment, the invention comprises a multiphase distributing circuit, and a plurality of mechanically coupled dynamo-electric machines of the commutator type, one for each phase of the system of distribution, a fly-wheel being also coupled to the said machine. The armatures of the machines are connected, respectively, to the various phases of the distributing circuit, and the field magnet windings are supplied from a multi-phase generator with currents of such a phase that the generated and counter electromotive forces of the armatures are of approximately the same phases as the electromotive forces of the circuits to which they are connected. The machines are caused to operate alternately as motors and generators by adjusting their field strengths in accordance with variations in the amount of current required of the distributing circuit, such adjustment being effected by varying the field strength of the multiphase generator from which the field magnet windings are supplied. The energy stored in the fly-wheel and in the rotatable system when the machines are operated as motors is yielded when the machines operate as generators and supply current to the distributing circuit.

In the single figure of the accompanying drawing, which is a diagrammatic view of a system of distribution embodying my invention, armatures 1 and 2 of two dynamo-electric machines of the commutator type of construction, that are adapted to operate either as motors or as generators, are mechanically coupled together and to a fly-wheel 3 whereby the rotatable system may be provided with considerable inertia, and are connected, respectively, between different pairs of conductors of a two-phase circuit 4—5—6—7 that is supplied from any suitable source, such as a generator 8, and that supplies current to any suitable load, such as an induction motor 9. Field magnet windings 10 and 11 of the dynamo-electric machines are supplied with exciting current, of substantially the same frequency as that of the distributing circuit 4—5—6—7, from a multiphase generator 12 that is driven by a synchronous motor 13 the armature of which is connected to the distributing circuit 4—5—6—7. The electromotive forces applied to the field magnet windings 10 and 11 by the generator 12 are substantially 90° out of phase with the electromotive forces of the circuit conductors to which the corresponding armatures are connected. Then, since the counter or generated electromotive forces of the armatures 1 and 2 differ approximately 90° in phase from the electromotive forces applied to the corresponding field magnet windings, the electromotive forces generated by the armatures will be of approximately the same phases as the electromotive forces of the circuits to which the armatures are connected and the counter electromotive forces of the armatures will be substantially opposite in phase to the said circuit electromotive forces. The dynamo-electric machines will, therefore, operate under the most favorable conditions as regards power factor and commutation. Field magnet windings 14 and 15, respectively, of the generator 12 and the synchronous motor 13 may be supplied with exciting current from a small direct current generator 16 that is carried by the shaft of, or is otherwise operated by, the synchronous motor 13, or they may be supplied from any other suitable source.

In circuit with the field magnet winding 14 of the generator 12 is a subdivided resistance 17 and a controlling device 18 for governing the amount of the resistance 17 that is included in the circuit of the winding 14, the said controlling device comprising a plurality of stationary contact terminals 19 that are connected to the respective points of subdivision of the resistance 17, an adjacent stationary conducting strip 20, and a movable conducting segment 21 that is adapted to be moved over the stationary contact terminals 19 and the strip 20 by means of an electromagnet having an actuating winding 22 to which current is supplied proportional in amount to that required of the distributing circuit by the load 9. In the present instance the magnet winding 22 is supplied with current proportional in amount to that which traverses the conductor 7 through a series transformer 23, but it will be understood, of course, that the winding may be connected directly in series with the conductor 7, or any other conductor of the distributing circuit, if desired.

If, during the operation of the system, only a small amount of current is required of the distributing circuit by the load 9, the movable segment 21 of the controlling device 18 will be lowered so as to include a large portion, or all, of the resistance 17 in series with the field magnet winding 14 of the generator 12 which has the effect of causing a decrease in the voltages applied by the generator to the field magnet windings 10 and 11. Because of the decreased field strengths of the dynamo-electric machines, the counter electromotive forces in the armatures 1 and 2 become materially less than the electromotive forces of the conductors to which the armatures are connected and the machines are, therefore, caused to operate as motors, energy being then stored in the rotatable system, including the fly-wheel 3. When the current required of the distributing circuit exceeds a predetermined amount, the movable segment 21 is raised, and a portion, or all, of the resistance 17 is removed from the circuit of the field magnet winding 14. The increased field strength in the generator 12 causes an increase in the voltage applied thereby to the field magnet windings 10 and 11 which, in turn, causes the electromotive forces generated in the armatures 1 and 2 to exceed the electromotive forces of the circuit conductors to which the armatures are connected, and the dynamo-electric machines are then operated as generators, utilizing the energy previously stored in the movable system as the actuating means.

While the invention has been shown as employed in connection with a two-phase system of distribution, it will be readily understood that it may also be employed in connection with systems of any other number of phases, and also that the parts may differ materially in structure and arrangement from what has been shown and described, without departing from its spirit.

I claim as my invention:

1. The combination with an alternating current distributing circuit, and a dynamo-electric machine having its armature connected thereto, of a synchronously operated generator for applying an electromotive force to the field magnet winding of the dynamo-electric machine of a different phase from that of the circuit to which the armature is connected, and means for adjusting the field strength of the generator in accordance with variations in the amount of current required of the distributing circuit.

2. The combination with a polyphase alternating current distributing circuit and a plurality of mechanically coupled dynamo-electric machines having their respective armatures associated with the differently phased electromotive forces thereof, of a synchronously operated generator for applying electromotive forces to the field magnet windings of the dynamo-electric machines that differ in phase, respectively, from those of the said circuits with which the corresponding armatures are associated, and means for adjusting the field strength of the generator in accordance with variations in the amount of current required of the distributing circuit.

3. The combination with a polyphase alternating current distributing circuit and a plurality of mechanically coupled dynamo-electric machines having their respective armatures associated with differently phased electromotive forces thereof, of means for applying to the field magnet windings of the machines electromotive forces that differ in phase, respectively, from those of the said circuit with which the corresponding armatures are associated, and means for effecting adjustment of the ratio of the respective electromotive forces of the said circuit and of the said armatures.

4. The combination with a polyphase alternating current distributing circuit and a plurality of mechanically coupled dynamo-electric machines having their respective armatures associated with the differently phased electromotive forces thereof, of means for causing the machines to operate as motors when the current required from the distributing circuit is less than a predetermined amount, and to operate as generators when the said current exceeds the predetermined amount.

5. The combination with a polyphase alternating current distributing circuit and a plurality of mechanically coupled dynamo-electric machines having their respective armatures associated with the differently phased electromotive forces thereof, of means for adjusting the field strengths of the machines in accordance with variations in the amount of current required of the distributing circuit.

6. The combination with a polyphase alternating current distributing circuit and a plurality of mechanically coupled dynamo-electric machines having their respective armatures associated with the differently phased electromotive forces thereof, of means for adjusting the field strengths of the machines to cause the same to operate as generators when the current required of the distributing circuit exceeds a predetermined amount and to operate as motors when the said current falls below the predetermined amount.

7. The combination with a polyphase alternating current distributing circuit and a plurality of mechanically coupled dynamo-electric machines having their respective armatures associated with the differently phased electromotive forces thereof, of a generator for supplying exciting current to the said machines, and means for adjusting the field strength of the generator in accordance with variations in the amount of current required of the distributing circuit.

In testimony whereof, I have hereunto subscribed my name this sixteenth day of October, 1907.

JOHN S. PECK.

Witnesses:
G. W. PINNER,
W. ROBINSON.